United States Patent
Nagatomi et al.

(10) Patent No.: US 8,512,602 B2
(45) Date of Patent: Aug. 20, 2013

(54) ITO POWDER AND METHOD OF PRODUCING THE SAME, COATING MATERIAL FOR TRANSPARENT CONDUCTIVE MATERIAL, AND TRANSPARENT CONDUCTIVE FILM

(75) Inventors: Akira Nagatomi, Tokyo (JP); Koji Tanoue, Tokyo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 232 days.

(21) Appl. No.: 12/733,949

(22) PCT Filed: Sep. 26, 2008

(86) PCT No.: PCT/JP2008/067441
§ 371 (c)(1),
(2), (4) Date: Jun. 16, 2010

(87) PCT Pub. No.: WO2009/044674
PCT Pub. Date: Apr. 9, 2009

(65) Prior Publication Data
US 2010/0252785 A1      Oct. 7, 2010

(30) Foreign Application Priority Data
Oct. 1, 2007   (JP) ................. 2007-258137

(51) Int. Cl.
*H01B 1/02*   (2006.01)
(52) U.S. Cl.
USPC ............. 252/519.1; 252/520.1; 106/287.19
(58) Field of Classification Search
USPC ........ 252/519.1, 520.1; 106/287.19; 428/697
See application file for complete search history.

(56) References Cited

U.S. PATENT DOCUMENTS

| 5,529,720 | A | 6/1996 | Hayashi et al. |
| 6,099,982 | A * | 8/2000 | Okabe et al. ............ 428/697 |
| 6,533,966 | B1 * | 3/2003 | Nonninger et al. ........ 252/520.1 |
| 6,936,100 | B2 * | 8/2005 | Tadakuma ............... 117/68 |

FOREIGN PATENT DOCUMENTS

| DE | 198 40 527 A1 | 3/2000 |
| JP | A-03-054114 | 3/1991 |
| JP | A-06-247716 | 9/1994 |
| JP | A-6-247716 | 9/1994 |
| JP | 2004-123418 | * 4/2004 |
| JP | 2004-143022 | * 5/2004 |
| JP | A-2005-272737 | 10/2005 |
| JP | A-2007-238337 | 9/2007 |
| JP | A-2007-269617 | 10/2007 |

OTHER PUBLICATIONS

International Preliminary Report on Patentability issued in Application No. PCT/JP2008/067441; Mailed on Dec. 22, 2008.
International Search Report issued in Application No. PCT/JP2008/067441; Mailed on Dec. 22, 2008 (With Translation).

(Continued)

*Primary Examiner* — Khanh Tuan Nguyen
(74) *Attorney, Agent, or Firm* — Oliff & Berridge, PLC (57) ABSTRACT

ITO particles are provided, which are small in variations of particle diameters and used for an ITO coating material capable of forming a transparent conductive film having high transparency and low haze value. Also, ITO coating material is provided, containing such ITO particles, and a transparent conductive film containing such ITO particles. Further, ITO powders are provided, wherein 90% or more of ITO particles constituting the ITO powders have a primary particle diameter of 20 nm or less.

2 Claims, 1 Drawing Sheet

(56) References Cited

OTHER PUBLICATIONS

Lee et al., "Solvent effect on synthesis of indium tin oxide nanopowders by a solvothermal process," *Journal of European Ceramic Society*, vol. 25, pp. 3307-3314, 2005.

Lee et al.; "Solvent effect on synthesis of indium tin oxide nanopowders by a solvothermal process;" *Journal of European Ceramic Society*; 2005; pp. 3307-3314; vol. 25.

Supplementary European Search Report dated Jan. 2, 2013 from European Patent Application No. 08835653.0.

\* cited by examiner

ITO POWDER AND METHOD OF PRODUCING THE SAME, COATING MATERIAL FOR TRANSPARENT CONDUCTIVE MATERIAL, AND TRANSPARENT CONDUCTIVE FILM

TECHNICAL FIELD

The present invention relates to ITO powder and a method of producing the same, a coating material for a coating material for a transparent conductive material including the ITO powder, and a transparent conductive film formed by using the coating material.

DESCRIPTION OF RELATED ART

An In oxide containing Sn, namely a film containing ITO (described as "tin-containing indium oxide" hereinafter in some cases) shows high light transmittance and conductivity to a visible light, and therefore is used as a transparent conductive film of each kind of display device and a solar cell. As a film forming method of the transparent conductive film containing ITO (described as ITO film hereinafter in some cases), a physical film forming method such as a sputtering method, and a coating method of coating the film with a particle dispersion liquid or an organic compound are known.

A coated film by the coating method has an advantage that it can be formed into a large area and a complicated shape without using an expensive device such as a vacuum device, although having slightly lower conductivity than that of the physical method such as a sputtering method, at a low cost. Further, among such coating methods, a method by the particle dispersion liquid makes it possible to form the film in a relatively low temperature process, compared with an organic compound coating method in which the coated film needs to be thermally decomposed, and excellent conductivity can also be obtained, and therefore is widely used as an electromagnetic wave shield film of a cathode-ray tube, and application to a display device such as LCD and EL is also examined.

Conventionally, as a method of producing ITO particles used in forming the ITO film, a method of adding alkali such as ammonia and caustic soda into an aqueous solution containing indium ion and tin ion, being an indium chloride aqueous solution and a tin chloride aqueous solution, to neutralize and precipitate the solution, then generating indium hydroxide containing tin, and applying heat treatment thereto at a high temperature of 500° C. or more under atmospheric pressure or in a reduction atmosphere, to crystallize the indium hydroxide, is disclosed.

As a method of producing ITO powders, a process of using an organic matter is also disclosed. According to a disclosure of the patent document 1, indium salt and tin salt are dissolved into an organic solvent, and thereafter alkali aqueous solution is added thereto, to thereby generate the indium hydroxide and the tin hydroxide, then after the obtained mixture of the indium hydroxide and the tin hydroxide is dried, heat treatment is applied thereto.

Further, according to a disclosure of patent document 2, by heating the indium hydroxide prepared in the aqueous solution is heated in an organic solvent at 200° C. to 350° C., the indium hydroxide containing tin is dissolved into the organic solvent and further precipitated, to thereby generate ultrafine particles, and by the generation of the ultrafine particles, lower temperature of the ITO particles and excellent crystallinity are made compatible with each other (see patent document 2).

Patent document 1: Japanese Patent Laid Open Publication No. 03-54114
Patent document 2: Japanese Patent Application No. 2006-101208

DISCLOSURE OF THE INVENTION

Problem to be Solved by the Invention

A conventional method of producing the ITO particles includes the steps of drying sol containing colloid particles of indium hydroxide and tin hydroxide; and thereafter baking a dried material by applying heat treatment thereto. However, an average particle diameter of each ITO particle of the obtained baked material after pulverization is 0.2 to 0.4 μm (namely, 200 nm to 400 nm) and is extremely coarse. In order to obtain good dispersability of the ITO particles, a dispersion step by means of a beads mill is performed for coating of the coarse ITO particles. However, even in such a case, the ITO particles with good dispersability are hardly obtained. Therefore, when ITO film formation is performed by ITO coating containing coarse ITO particles, the dispersability and transparency of the ITO particles are not necessarily sufficient. Further, when the indium hydroxide is baked at a high temperature, there is a problem that the ITO particles are coagulated, and in some cases, are coagulated and coarsened so strong that the particles are bonded to each other strongly and can not be pulverized. However, when the baking temperature is decreased to suppress coagulation, crystallization is insufficient this time, and a sufficient conductivity can not be obtained after forming the ITO film.

Here, according to patent document 1, coagulation of primary particles is reduced, by mixing the indium hydroxide and the tin hydroxide in an organic solvent. However, heat treatment is applied thereto up to 550° C. Then, the ITO particles are baked and coarsened at 550° C. in a relatively high temperature region.

Meanwhile, according to patent document 2 proposed by inventors of the present invention, the indium hydroxide is dispersed in the organic solvent and heat treatment is applied thereto in the solvent at 240° or more and 350° C. or less, to thereby synthesize fine ITO particles, being a coating material, without coagulation and baking among ITO particles. The ITO particles prepared by this producing method are formed in a single nano-size and extremely small. However, extremely large particles are also simultaneously generated, because particles of almost 50 nm at maximum are mixed, and there are wide distribution and variation of the particle diameter of each ITO particle.

When the ITO particles are formed on a glass or a film substrate as a transparent conductive film, an influence on a film thickness is small even if the coarse particles of almost 50 nm exist as described above, when the film thickness of the transparent conductive film is 200 nm or more and is four or five times thicker than ITO particle diameter. However, when an extremely thin film having film thickness of 200 nm or less is formed, variation in a thickness of a coating film occurs by an existence of the coarse ITO particles of about 50 nm, then a wide particle diameter distribution of the ITO particles results in a coarse surface of the coating film, thus damaging a smoothness of the surface of the coating film. Then, when the smoothness of the surface of the coating film is damaged, scattering of light occurs, and a haze value is deteriorated.

Further, when an inkjet system is used as a coating system, the ITO particles are passed through a nozzle piping having an extremely small diameter in some cases. Therefore, large ITO particles contained in the coating material are caught in a nozzle, thereby causing clogging of a head portion. Therefore, it is preferable not to contain the coarse ITO particles as much as possible.

Further, in order to suppress the scattering of light in the transparent conductive film after film formation, fine ITO particle diameter is preferable. This is because by making the ITO particles finer, a uniform transparent conductive film is easily formed, and an effect of improving optical characteristics such as haze can be obtained.

In view of the above-described circumstance, an object of the present invention is to provide the ITO particles used in the ITO coating material, the ITO coating material containing the ITO particles, and the transparent conductive film containing the ITO particles, capable of forming the transparent conductive film with small variation of the particle diameter, high transparency, and small haze value.

Means for Solving the Problem

In order to solve the above-described problem, as a result of studying by inventors of the present invention, a new structure is achieved in which salt containing indium and salt containing tin are thermally decomposed by a wet-type process in an organic solvent, to thereby form a precursor containing indium and tin, and further the precursor thus obtained is reacted in the organic solvent, to thereby generate ITO particles as particle dispersion liquid. Then, it is found that variation of a particle diameter is reduced and ultrafine ITO particles with a primary particle having average particle diameter of 20 nm or less, can be obtained.

Namely, in order to solve the above-described problems, a first structure provides ITO powders, wherein 90% or more of ITO particles constituting the ITO powders are ITO particles, each having a primary particle diameter of 20 nm or less.

A second structure provides the ITO powders according to the first structure, wherein a specific surface area of the ITO powders is 50 $m^2/g$ or more.

A third structure provides the ITO powders according to the structure 1 or 2, wherein a crystallite diameter obtained by X-ray diffraction is 20 nm or less.

A fourth structure provides a method of producing ITO powders, comprising:

dissolving salt containing indium and salt containing tin into an organic solvent, then applying heat treatment to the organic solvent at a decomposition temperature or more of the salt containing indium and the salt containing tin, and at 250° C. or less, and thermally decomposing the salt containing indium and the salt containing tin, to thereby prepare a precursor containing indium and tin; and applying heat treatment to the precursor containing the indium and tin in the organic solvent heated at 200° C. or more and 350° C. or less, to thereby generate ITO particles.

A fifth structure provides a method of producing the ITO powders according to the fourth structure, wherein the salt is nitrate salt.

A sixth structure provides a method of producing the ITO powders according to the fourth or fifth structure, wherein the organic solvent used in the second step has a boiling point of 200° C. or more.

A seventh structure provides a method of producing the ITO powders according to the fourth or fifth structure, wherein the organic solvent used in the first or second step has one or more OH groups per one molecule.

An eighth structure provides a method of producing the ITO powders according to the fourth to seventh structures, wherein the organic solvent used in the first or second step is polyol.

A ninth structure provides a method of producing the ITO powders according to the fourth to eighth structures, wherein the organic solvent used in the first step is at least one or more solvents selected from one kind, or two kinds or more of ethylene glycol, diethylene glycol, triethylene glycol, tetraethylene glycol, polyethylene glycol, propylene glycol, dipropylene glycol, and tripropylene glycol.

A tenth structure provides a method of producing the ITO powders according to the fourth to ninth structures, wherein the organic solvent used in the second step is at least one or more solvents selected from one kind or two kinds or more of diethylene glycol, triethylene glydol, tetraethylene glycol, polyethylene glycol, and tripropylene glycol.

An eleventh structure provides a coating material for a transparent conductive material, containing the ITO powders according to any one of the first to third structures.

A twelfth structure provides the coating material for a transparent conductive material according to the eleventh structure, wherein a specific surface area of each ITO powder is 50 $m^2/g$ or more, which is generated when the coating material for a transparent conductive material is dried at 200° C. or less.

A thirteenth structure provides a transparent conductive film, which is produced by using the coating material for a transparent conductive material according to the eleventh or twelfth structure.

Advantage of the Invention

Each ITO particle according to the present invention has a small particle diameter and little variation of the particle diameter, with no coagulation and baking among ITO particles. Therefore, a transparent conductive film formed by the ITO coating material, has a uniform coating film surface with high transparency and small haze value can be formed.

BEST MODE FOR CARRYING OUT THE INVENTION

Best mode for carrying out the invention will be described hereinafter.

In a transparent conductive film, its transparency is the most important characteristic. As a condition of transparency of a film, it is required that there is small reflection to incident light, and there is no absorption and scattering in a visible area. When powders, being a scattering source, are substances of one kind, scattering depends on a particle diameter of each powder and a wavelength of a target light, and can be calculated by formulas of Mie scattering and Rayleigh scattering.

Here, the Mie scattering is the scattering of light when the particle diameter can not be ignored compared with a wavelength, involving a problem when the particle diameter is greater than about 1/10 of the wavelength. Meanwhile, when the particle diameter is sufficiently small with respect to the wavelength, the Rayleigh scattering is a governing factor. The scattering of the particles according to the present invention is in a range of the Rayleigh scattering. Therefore, the Rayleigh scattering will be described hereinafter.

Generally, greatest scattering occurs in a case of the powders having a particle diameter corresponding to a half of the wavelength of a target light. When the particle diameter of such powders is outside of the aforementioned particle diameter and becomes further smaller than the wavelength of the target light, the scattering becomes rapidly smaller in proportion to 6 time multiplication of the particle diameter, by the following Rayleigh scattering.

$$Ks=(4\pi^5/3\lambda^4)\times d\times[(M^2-1)/(M^2+2)]$$

Ks: scattering coefficient, $\lambda$: wavelength, d: particle diameter, $M=n_0/n_1$, $n_0$: refractive index of substance, n1: refractive index of medium Here, it is found that by setting the wavelength of the visible area to 0.4 to 0.8 μm, and setting the particle diameter of each powder to 0.9 μm or less, and uniformly dispersing the powders, the powders composed of such particles can be made transparent to the visible light.

The ITO powders of this embodiment have 90% or more of particles with a primary particle diameter of 20 nm or less by number of powders. With this structure of the ITO particles, it is found by inventors of the present invention that a haze value, being one of the optical characteristics, is improved and a total light transmissivity is also increased, in the transparent conductive film including the ITO particles. Note that the total light transmissivity means a ratio of the light transmitted through an object, without being reflected by the object, when the object (the transparent conductive film containing the ITO particles in this embodiment) is irradiated with light.

It is further found by the inventors of the present invention that in addition to the aforementioned structure, when the ITO powders of this embodiment have 90% or more of particles with a primary particle diameter of 15 nm or less by number of powders, the haze value can be further improved.

Dispersability of the ITO particles is excellent in the ITO coating material containing the ITO particles prepared in this embodiment. In a conventional ITO coating material, a dispersing agent is added to improve the dispersability of the ITO particles. However, in a case of using the ITO powders according to this embodiment, the ITO particles are fine particles and exist as independent particles without contact with each other among particles, and therefore a uniform ITO coating film with low haze value and no unevenness can be obtained, without using the dispersing agent.

(Generation Mechanism of the Ito Particles According to this Embodiment)

A generation mechanism of the ITO particles according to this embodiment will be described.

The ITO particles according to this embodiment is generated, through a first step of dissolving inorganic salt containing indium and inorganic salt containing tin into an organic solvent, then thermally decomposing them in the organic solvent at a decomposition temperature or more of the salt containing indium and the salt containing tin and at 250° or less, to thereby prepare a precursor containing indium and tin; and a second step of generating the ITO particles by applying heat treatment thereto in the organic solvent at 200° C. or more and 350° C. or less.

Here, the decomposition temperature of the salt containing indium and the salt containing tin is the temperature for separating a metal element and an acid group in both salts, at the time of heating the salts in which the metal element and the acid group are bonded to each other.

In a method of producing the ITO particles of performing heat treatment in the organic solvent disclosed by this applicant in patent document 2, first, indium hydroxide containing tin in an aqueous solution is prepared, then the indium hydroxide containing tin is dispersed in the organic solvent, and heat treatment is applied thereto in the organic solvent at 240° C. or more and 350° C. or less, to thereby synthesize the ITO particles and the coating material. The ITO particles obtained by this producing method are fine particles of a single nano-size. However, extremely large particles are simultaneously generated because particles of almost 50 nm at maximum are mixed, and a distribution of the particle size is widely varied, with respect to an average particle diameter of the ITO particles.

Meanwhile, in generating the ITO particles according to this embodiment, in the first step, the salts containing indium and tin are directly dissolved into the organic solvent, then heat treatment is applied to the organic solvent at the decomposition temperature or more of the salt containing indium and the salt containing tin and at 250° C. or less, to thereby generate the precursor containing indium and tin in the organic solvent.

According to the first step, when a method of preparing tin-containing indium hydroxide in an aqueous solution and dissolving/dispersing it in the organic solvent, and a method of neutralizing the salt containing indium and the salt containing tin by alkali and dispersing the tin-containing indium hydroxide, are compared, further fine precursor can be dispersed into the organic solvent, by preparing the precursor by thermally decomposing indium salt and tin salt directly in the organic solvent.

As a result, the precursor generated by thermal decomposition in the organic solvent is extremely fine, and therefore an exact identification of a crystal phase by X-ray diffraction can not be performed, even if it is tried. The precursor obtained in the organic solvent is possibly estimated to be a single substance or a mixture of indium hydroxide containing tin, indium oxihydroxide, or a solvent and an indium organic compound.

As the salt that can be used in generating the ITO particles of this embodiment, it is preferable to use the salt which is decomposed when heated and turned into oxide, oxihydroxide, and hydroxide. Specifically, as salts containing indium, inorganic salts such as indium nitrate, indium sulfate, indium phosphoric acid, indium chloride, and organic salts such as indium acetic acid, indium oxalic acid, indium tartrate, and indium alkoxide, can be given, and such salts may be used as a single substance or a mixed substance.

Further, as salts containing tin, inorganic salts such as tin nitrate, tin sulfate, tin phosphoric acid, and tin chloride, and organic salts such as tin alkoxide including tin acetic acid, tin oxalic acid, tin tartrate, tin methoxide, tin ethoxide, tin propoxide, and tin butoxide can be given. Such salts may be used as a single substance or a mixed substance.

An organic metal salt may be used as the salt containing indium and tin. However, the organic metal salt is more expensive than the inorganic salt. Further, generally the organic salt has weak hydrophilic properties, and when dissolved into an organic solvent having the hydrophilic properties of this embodiment, the salts are not uniformly dispersed in the organic solvent, resulting in a case that a dissolution residue is generated due to insufficient solubility to the organic solvent or the solvent is divided into two layers. Accordingly, as a preferable raw material, the inorganic salt can be given, which can be available at a low cost and having strong hydrophilic properties.

Then, as the salts containing indium, and the salts containing tin, the raw material having the decomposition temperature of 250° C. or less is preferably used. This is because a generation temperature of the ITO particles is in the vicinity of 250° C., and therefore by using the raw material having the decomposition temperature of 250° C. or less as the salts containing indium and the salts containing tin, it is possible to avoid a state in which indium and tin directly generates ITO simultaneously with decomposition of the salts, without use of a precursor.

Therefore, as the raw materials of the salts containing indium and the salts containing tin, indium nitrate, tin nitrate, indium acetic acid, indium oxalic acid, indium tartrate, are preferable, and indium nitrate and tin nitrate are most preferable. By thermally decomposing such raw materials, pH in the solvent is fluctuated from an acid side to a neutral side, and metal ions in other solvent are simultaneously deposited, thus generating a fine precursor of tin-containing indium.

Regarding the salts, being the raw materials, crystalline salts may be directly dissolved into the organic solvent, or aqueous solution with crystalline salts dissolved therein, may be used. However, preferably moisture contained in the raw material is reduced. This is because when the moisture is increased in each raw material, the raw material is re-dissolved and precipitated in the moisture contained in the organic solvent during thermal decomposition, thus possibly preventing the formation of the uniform and fine precursor, and further extra energy is required for adding heat of an amount sufficient to evaporate the moisture contained in the organic solvent during heating at a high temperature.

Next, the tin-containing indium precursor is turned into the ITO particles, through the second step of applying heat treatment to the tin-containing indium precursor obtained by the first step, at a low temperature of 200 to 350° C. in the organic solvent. Since tin-containing indium precursors are extremely finely and uniformly dispersed in the first step, each particle is turned into a fine ITO particle in the second step, and an extremely fine and uniform sized particle can be obtained.

In the first step of this embodiment, the organic solvent having a boiling point of 100° C. to 350° C. may be used. When the decomposition temperature of the indium salts and the tin salts used as the raw materials is low, the organic solvent having a low boiling point may be selected, and may be suitably selected depending on the decomposition temperature of the raw material salts. Further, in the second step, the organic solvent having the boiling point of 200° C. or more may be used. This is because the ITO particles are generated by heat treatment in the organic solvent, and therefore when the boiling point of the organic solvent is set to 200° C. or more, volatilization of the organic solvent to outside a reaction system can be prevented. Accordingly, regarding the organic solvent used in this embodiment, the boiling point is set to 200° C. or more and preferably set to 230° C. or more.

As the generation temperature is lower, facilities and power consumption cost can be reduced in the production required for generating the ITO particles, and therefore there is an advantage that a production cost can be reduced. However, generally, when the ITO particles are generated at a low temperature, its crystallinity would be deteriorated. However, in the generation of the ITO particles of this embodiment, compatibility between low temperature generation and excellent crystallinity is achieved. Although the reason therefore is not clarified, it can be considered that by uniformly dispersing ultrafine particles in a stage of the precursor, energy efficiency is increased, and the generation temperature of the ITO particles can be decreased.

Further, regarding the organic solvent that can be used in generating the ITO particles of this embodiment, the solvent having at least one or more OH group per one molecule is preferable. Above all, polyhydric alcohol is preferable and ethylene glycol, diethylene glycol, triethylene glycol, tetraethylene glycol, polyethylene glycol, 1.2-propylene glycol, 1.3-butylene glycol, 2.3-butylene glycol, hexylene glycol, dipropylene glycol, tripropylene glycol, and glycerin are further preferable. However, the organic solvent is not limited thereto, and in the first step, the polyhydric alcohol or its derivative, or ionic liquid having the boiling point of 100° C. to 350° C. or less may be used, and in the second step, the polyhydric alcohol or its derivative, or ionic liquid having the boiling point of 200° C. or more and further preferably 230° C. or more may be used. The reason therefore can be considered that the hydrophilic properties of the salts, being starting materials, are strong, and therefore the organic solvent has the OH group, or in a case of the ionic organic solvent, it is easily adsorbed on the surface of the particles, and therefore final dispersability of the ITO particles is improved. Of course, not only one kind of the organic solvent but two kinds thereof may be used in a mixed state. Further preferably, a water-soluble organic solvent having strong hydrophilic properties capable of dissolving 50 vol % or more water may be used.

As described above, the organic solvent used in generating the ITO particles of this embodiment has preferably one or more OH groups per one molecule. However, the organic solvent exhibits a different effect, by having one or more OH groups per one molecule. This is the effect that O (oxygen) is deprived of the tin-containing indium oxide by the OH group that exists in the organic solvent, and the tin-containing indium oxide is then reduced to generate oxygen defect. A carrier is generated in the ITO particles generated due to the oxygen defect which is generated as described above, and therefore conductivity is improved.

Here, from the viewpoint of a compound having increased amount of OH groups, polyol having two or more OH groups per one molecule is preferable as the organic solvent.

However, the preferable organic solvent is not limited to polyol, and may be polyhydric alcohol or its derivative. Further, the following type of organic solvent may also be acceptable. Namely, even if the OH group is absent in the organic solvent itself at an initial time, hydrolysis is caused by presence of moisture, etc, contained in the raw materials, and alcohol is generated as a result. As such a type of organic solvent, for example, olein acid and oleylamine can be given. Further, the aforementioned organic solvent may also include a carboxylic acid group and an amine group.

As described above, as examples of the organic solvent preferable for generating the ITO particles according to this embodiment, at least one or more organic solvents selected from ethylene glycol, diethylene glycol, triethylene glycol, tetraethylene glycol, polyethylene glycol, propylene glycol, dipropylene glycol, and tripropylene glycol, can be given. Above all, diethylene glycol, triethylene glycol, tetraethylene glycol, polyethylene glycol are more preferable in consideration of the viewpoint that they are liquid at a normal temperature and can be used at a low cost.

Note that the ITO particles with no oxygen defect are generally white or yellow particles. However, the ITO particles having oxygen defect are green or blue particles. All ITO particles of this embodiment are blue-based particles, and it is found that the ITO particles having oxygen defect are generated.

(Coating Material for Transparent Conductive Material Containing Tin-Containing Indium Oxide According to this Embodiment)

In the coating material for a transparent conductive material containing tin-containing indium oxide according to this embodiment, water, the organic solvent having polarity, or a mixed solvent of them are preferably used as the solvent. This is because the surface of each ITO particle has polarity and hydrophilic properties, and therefore when the coating material for a transparent conductive material is formed, the polar solvent like water is preferably present in the solvent.

Even in the coating materials containing the ITO particles of this embodiment, the ITO particles are requested not to be precipitated when the coating materials are set to stand still. The precipitation here means separation of a coating solvent into a precipitating layer and a transparent supernatant layer, when the coating materials are separated at 3000 rpm for minutes by using a centrifugal separator. The precipitation of the particles in the coating material containing the ITO particles is considered to be caused in a case in which the particles are coagulated or coarse particles are formed from the beginning. Then, in the coating material containing the ITO particles, when the coagulation of the ITO particles occurs and the coarse particles are present from the initial time, non-uniformity of the film thickness occurs at the time of forming the ITO coating film by using the coating material, then the conductivity is deteriorated, resulting in an increase of the haze value. Accordingly, in the coating material containing the ITO particles, it is an ideal state that the ITO particles are dispersed only by Brownian motion, and are not precipitated.

The coating material for a transparent conductive material according to this embodiment includes the ITO powders of this embodiment, water, and the organic solvent having polarity and the mixed solvent of them, wherein the ITO particles are not precipitated even if the materials are set to stand still. By using the coating material, the uniform coating film can be formed, and by baking the uniform coating film, the conductive coating film having low haze and excellent conductivity can be obtained.

[Method of Producing the Ito Powders of this Embodiment]

Next, the method of producing the ITO particles of this embodiment will be described.

<Raw Materials>

As the salt that can be used in generating the ITO particles of this embodiment, the salt that is decomposed by heating and is turned into the oxide, oxihydroxide, and hydroxide, is preferable. If specifically shown, as the salts containing indium, the inorganic salts such as indium nitrate, indium sulfate, indium phosphoric acid, indium chloride, and organic salts such as indium acetic acid, indium oxalic acid, indium tartrate, and indium alkoxide, can be given, and such salts may be used as a single substance or a mixed substance. Further, similarly, as the salts containing tin, the inorganic salts such as tin nitrate, tin sulfate, tin phosphoric acid, and tin chloride, and organic salts such as tin alkoxide including tin acetic acid, tin oxalic acid, tin tartrate, tin methoxide, tin ethoxide, tin propoxide, and tin butoxide can be given. Such salts may be used as a single substance or a mixed substance. Further, as the raw materials, indium nitrate, tin nitrate, indium acetic acid, tin acetic acid, indium oxalic acid, and indium tartrate, etc, which are decomposed by heating at 250° C. and turned into oxide, oxihydrate, and hydrate, are mixed. As a particularly preferable raw material, indium nitrate can be given.

<Precursor Forming Step>

As the generating step of the ITO particles according to this embodiment, first, in the first step, the precursor containing indium and tin is obtained. In the first step, the raw materials as described above are dissolved into the organic solvent, and the precursor containing indium and tin is thermally decomposed in the organic solvent at the decomposition temperature or more of the salts containing indium and the salts containing tin, and at 250° C. or less, to thereby obtain the precursor mainly composed of indium.

The organic solvent used in the first step will be further described.

The organic solvent used in the first step has preferably the boiling point of 100° C. or more and 350° C. or less. Then, as the organic solvent used in the first step, the solvent having at least one or more OH groups per one molecule is preferable. Above all, polyhydric alcohol is preferable and ethylene glycol, diethylene glycol, triethylene glycol, tetraethylene glycol, polyethylene glycol, propylene glycol, dipropylene glycol, and tripropylene glycol, are further preferable. However, the organic solvent is not limited thereto, and alcohol (such as hexyl alcohol and heptanol) or the polyhydric alcohol or its derivative, or ionic liquid, having the boiling point of 100° C. or more and 200° C. or less may also be used. Not only one kind of the organic solvent but two kinds thereof may be used in a mixed state. When the decomposition temperature of the salts containing indium or the salts containing tin, being the starting materials, is low, the organic solvent with low boiling point may be selected, and the organic solvent with higher boiling point than the decomposition temperature of the indium salts and the tin salts used as the raw materials may be selected. Further, since the indium salts and the tin salts used as the raw materials, have the hydrophilic properties, it can be considered that the organic solvent is adsorbed on the surface of each particle by using the hydrophilic organic solvent, thereby contributing to improvement of the dispersability of the ITO particles.

Regarding the indium salts and the tin salts, being the raw materials, although each crystal salt may be dissolved directly into the organic solvent, an aqueous solution with each crystal salt dissolved therein may also be used. However, preferably the moisture contained in the raw materials is reduced. This is because when the moisture is increased in each raw material, the raw material is re-dissolved and precipitated in the moisture contained in the organic solvent during thermal decomposition, thus possibly preventing the formation of the uniform and fine precursor, and further extra energy is required for adding heat of an amount sufficient to evaporate the moisture contained in the organic solvent during heating at a high temperature.

By thermally decomposing such raw materials, pH in the solvent is fluctuated from the acid side to the neutral side, and other metal ions in the solvent are simultaneously deposited. For example, when the indium nitrate and the tin chloride are mixed in the solvent, nitric acid ions are decomposed by heating and are turned into $NO_x$ gas, and are removed from the organic solvent in a state of gas. Simultaneously, tin ions are deposited in the solvent, and the precipitation of the tin-containing indium precursor is generated.

Slurry of the precursor generated in the first step may be used as it is together with the organic solvent in the second step. However, when the precursor slurry is collected by solid-liquid separation and washed to remove impurity ions therefrom, a cake of the tin-containing indium precursor with higher purity can be obtained, and this is preferable. At this time, a washing agent such as pure water into which the impurity ions are easily dissolved, may be used in a single state or in a mixture state with the organic solvent. However, washing by a single use of the organic solvent similar to the organic solvent used in this embodiment is preferable, in consideration of the dispersion in the next step.

<Heat Treatment>

Next, the ITO particles are generated from the tin-containing indium precursor in the second step wherein heat treatment is applied to the tin-containing indium precursor, which is obtained in the first step, in the organic solvent at 200 to 350° C.

The organic solvent used in the second step will be further described.

The organic solvent used in the second step has the boiling point of 200° C. or more and 350° C. or less. This is because the tin-containing indium oxide powders are generated by heat treatment in the organic solvent, and therefore when the boiling point of the organic solvent is 200° C. or more, the organic solvent is prevented from being thermally decomposed and being volatized to outside the reaction system. Accordingly, the organic solvent used in this embodiment has the boiling point of 200° C. or more and preferably 230° C. or more. Then, preferably, the organic solvent used in this embodiment has at least one or more OH groups per one molecule, in the same way as the first step. Above all, polyhydric alcohol is preferable and diethylene glycol, triethylene glycol, tetraethylene glycol, polyethylene glycol, tripropylene glycol, are further preferable. However, the organic solvent is not limited to such solvents, and alcohol having the boiling point of 200° C. or more and 350° C. or less, or the polyhydric alcohol, or the derivative of the polyhydric alcohol, and further ionic liquid may also be preferable. These organic solvents may be used as only one kind or as a mixture of two kinds or more.

Atmosphere gas used for generating the ITO particles of this embodiment is inactive gas and/or reductive gas. Preferably, carbon monoxide, nitrogen, hydrogen, rare gas, and ammonia gas are used as the atmosphere gas. Further preferably, nitrogen and hydrogen can be given as examples. Such atmosphere gases may be used as one kind or may be used in a mixed state of two kinds or more.

<Heat Treatment Equipment>

As a heater used in this embodiment, for example, a mantle heater, ribbon heater, oil bus, etc, can be given. When heating up to 350° C. is possible, various heaters can be applied.

<Reactor>

It is preferable that a reactor used in this embodiment withstands 350° C. However, in consideration of the fact that the organic solvent is slightly volatilized during heat treatment, it is preferably that in the reactor, an air-tight state is maintained even under pressure of 0.1 MPa and reflux means is provided.

<Solid-Liquid Separation>

The solid-liquid separation is the step of recovering the ITO particles generated after heat treatment in the organic solvent.

A centrifugal separation method and a suction filtration method can be applied to the slid-liquid separation. However, the ITO particles generated in this embodiment have excellent dispersability, and therefore when the suction filtering method is applied, secondary coagulation needs to be caused by adding a coagulating agent. Accordingly, application of the centrifugal separation method is preferable, from the viewpoint of preventing addition of extra medical agent. For example, 3000 rpm and 30 min can be given as conditions of the centrifugal separation.

<Washing>

Washing is performed for removing impurities from the generated ITO particles. Specifically, the ITO particles and the organic solvent are separated from each other by the centrifugal separation method, after heat treatment in the organic solvent as described above, and washing liquid is added to the separated ITO particles. The pure water, organic solvent having polarity, or the mixed solution of them can be preferably used as the washing liquids. After the washing liquid is added, ultrasonic dispersion for washing the ITO particles is performed. At this time, forcible stirring may be used together, by means of a homomixer. After ultrasonic dispersion, the mixture of the washing liquid and the ITO particles are subjected to solid-liquid separation again by using the solid-liquid separation. For example, 3000 rpm and 30 min can be given as the conditions of the centrifugal separation. The aforementioned process of centrifugal separation-addition of the washing liquid-ultrasonic dispersion, is set as one washing unit, and by repeatedly executing this washing unit, the impurities in the ITO particles can be reduced. The number of repetitions is once or preferably three times or more.

<Solvent Substitution>

In order to obtain the ITO dispersion liquid after washing of the generated ITO particles is ended, solvent substitution is executed. The solvent whose boiling point is 300° C. or less, or preferably 200° C. or less can be used as a substitution liquid for executing solvent substitution. This is because when the boiling point is 300° C. or less, the solvent is volatilized and is not remained at the time of coating a film with ITO coating liquid and baking the coating film, and therefore a surface resistance value is not increased as a result, and deterioration of haze can be prevented. As the solvents for obtaining the ITO dispersion liquid, water, alcohols such as methanol, ethanol, propanol, isopropyl alcohol, butanol, hexanol, heptanol, octanol, decanol, cyclohexanol, and terpineol, glycols such as ethylene glycol and propylene glycol, ketones such as acetone and methylethyl ketone and diethyl ketone, esters such as ethyl acetate, butyl acetate, and benzyl acetate, ether alcohols such as methoxyethanol and ethoxyethanol, ethers such as dioxane and tetrahydrofuran, acid amids such as N,N-dimethylformamide, aromatic hydrocarbons such as benzene, toluene, xylene, trimethylbenzene, and dodecylbenzene, long chain alkane such as hexane, heptane, octane, nonane, decane, undecane, dodecane, tridecane, tetradecane, pentadecane, hexadecane, octadecane, nonadecane, eicosane, and trimethylpentane, cyclic alkane such as cyclohexane, cycloheptane, and cyclooctane, which are liquids at a normal temperature, may be suitably selected and used. The solvent substitution in this case also, may be executed by using one washing unit of the "centrifugal separation-addition of washing liquid-ultrasonic dispersion" described in explanation of washing.

[Example of Producing the Coating Film Using the ITO Dispersion Liquid According to this Embodiment]

In coating the substrate with the ITO dispersion liquid of this embodiment, a publicly-known method such as screen printing, spin coating, dip coating, roll coating, brush coating, and spray coating, can be used. Further, when the surface of the substrate is coated with the ITO dispersion liquid, organic polymer, plastic, and glass, etc, can be given as substrate materials. However, as the substrate shape, film-like shape is generally used. Particularly, a polymer film is preferable for the substrate in which flexibility is required like a touch panel, and films such as polyethylene terephthalate (PET), poly (ethylene naphthalate) (PEN), polyimide, alamide, polycarbonate can be used for the polymer film.

The transparent conductive film containing the ITO powders according to this embodiment formed on the substrate material has a high transparency and a small haze value.

EXAMPLES

Example 1

32.8 g of Indium nitrate aqueous solution ($In(NO_3)_3$) having 22.79 wt % indium concentration, and 1.68 g of tin chloride ($SnCl_2.2H_2O$) were weighed, and dissolved into 190 ml of triethylene glycol, to thereby prepare a triethylene glycol mixed solution containing indium nitrate and tin chloride. Note that the concentration of tin in the mixed solution is 10 mol % with respect to a total of indium and tin.

The mixed solution was sufficiently stirred at a room temperature, and was heated from the room temperature to 125° C. at a temperature increase rate of 2° C./min, while flowing nitrogen into the reaction vessel at 200 mL/min, and was kept for one hour after the temperature reaches 130° C. Immediately after the temperature reached 130° C., indium nitrate was decomposed, and the mixed solution, which was transparent immediately after start of the temperature increase, became cloudy simultaneously with discharge of NOx gas and water vapor, to thereby generate a tin-containing indium precursor. Thereafter, after the mixed solution was cooled to the room temperature, the generated tin-containing indium suspended material was filtered and collected, and cleaned by 100 ml of triethylene glycol, to thereby obtain the tin-containing indium precursor. Note that although solution pH was 0.90 immediately after start of the reaction, the solution pH immediately after end of the reaction was 3.40.

Next, the precursor mainly composed of the indium was added again to 190 ml of triethylene glycol and stirred, to thereby disperse the precursor into the triethylene glycol. The mixed solution was further sufficiently stirred at the room temperature, and was heated from the room temperature to 280° C. at a temperature increase rate of 2° C./min, while flowing nitrogen into the reaction vessel at 200 mL/min, and kept for four hours after the temperature reached 270°. Further, in order to prevent evaporation of the triethylene glycol during heating, a capacitor is fitted to the reaction vessel, so that the reaction is advanced while flowing out the triethylene glycol.

When heating and heat-retention were ended, a reactant was cooled to the room temperature, which was then taken out and fractionated in a centrifugal settling tube, to thereby perform centrifugal separation at 3000 rpm for 30 minutes, and perform solid-liquid separation. Note that the solvent after end of the reaction had blue color, and it was confirmed that the ITO particles having oxygen defect were generated.

After the solid-liquid separation, triethylene glycol was removed from the reactant, and hexanol was added instead, and ultrasonic dispersion was performed, and thereafter one washing unit of "centrifugal separation-addition of washing liquid-ultrasonic dispersion" was performed three times. Thereafter, the washing solvent was substituted with ethanol, and the "centrifugal separation-addition of washing liquid-ultrasonic dispersion" was executed. In this example, the same ethanol was used in the solvent for washing and the solvent for dispersion, and therefore the solvent substitution was completed simultaneously with washing, and the ITO dispersion liquid was thereby obtained.

In order to evaluate particle characteristics of the ITO particles according to example 1, the ITO dispersion liquid was dried in the atmosphere at 70° C., to thereby obtain the ITO powders. The following characteristic measurement was executed to the ITO powders. A measurement result thereof was shown in table 1.

<Measurement Method of Primary Particle Diameter>

A particle diameter measurement of the ITO particles was performed in such a manner that a volume average diameter and a maximum diameter of the particles were calculated by measuring a size of an image of a primary particle of the ITO particle in TEM photograph. At this time, when a plurality of primary particles were overlapped on one another, such particles were set out of a measurement target. A plurality of primary particles simply in contact with other particles on the surface of each primary particle, were regarded as the measurement target, because outlines of the plurality of primary particles could be easily recognized. Further, a 200,000 magnified photograph was used as the TEM photograph. In measurement, a maximum length portion in the ITO primary particles was decided, then the length of this portion was measured, and a measured value thereof was set as a diameter (particle diameter). Note that the primary particles to be measured was 100 particles.

Here, a calculation method of the volume average diameter will be described in detail.

A volume of the primary particle was calculated as an approximation of a cube, from the diameter of the primary particle to be measured, and a volume average diameter was calculated from an average value of the volume of the primary particle.

Figure 1:
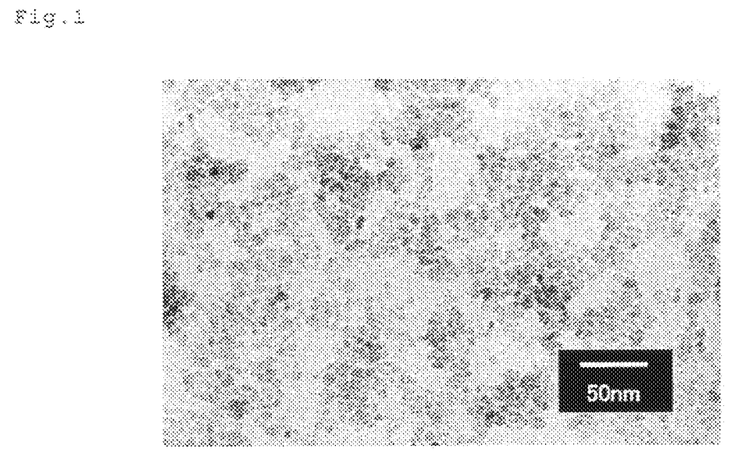
FIG. 1 is a TEM photograph of ITO particles according to example 1.

The ITO particles of the example 1 are shown in FIG. 1, being the TEM photograph of 200,000 magnification (visual field: 350×250 nm).

<Calculation Method of a Number Proportion>

In a calculation method of a number proportion, an existence ratio of the ITO particles having a prescribed particle diameter was calculated when 100 primary particles of ITO were measured. For example, when 100 primary particles of ITO were measured and 50 particles having primary particle diameter of 10 nm or less were measured, the number proportion was 50%.

<Measurement Method of Bet Value>

In the BET measurement, the BET value was obtained by a BET one-point method, by using MONOSORB by Quantachrome Inc. as a measurement device.

<Measurement Method of Bet Diameter>

BET diameter (specific surface area) was obtained by the following formula.

$$(BET \text{ diameter}) = 6/(\rho \times 10^6 \times BET \text{ value}) \times 10^9$$

wherein $\rho$: density of particles=7.2 g/cm$^3$, BET value: (m$^2$/g).

<Measurement Method of a Crystallite Diameter>

K$\alpha$1 ray of Cu was used as an X-ray source, and the crystallite diameter was obtained by the following formula (formula of Scherrer) from a half value width and a position of (222) diffraction peak.

$$t = 0.9 \times \lambda/(B \times \cos \theta)$$

wherein t: crystallite diameter, $\lambda$: wavelength of K$\alpha$1 ray of Cu, B: half value width, $\theta$: diffraction angle As a result of evaluating the ITO particles obtained by the example 1, it was found that the volume average particle diameter of the primary particle was 7.2 nm, the maximum diameter was 8.5 nm, the number proportion of the ITO particles having the primary particle diameter of 20 nm or less was 100%, the BET diameter was 13.3 nm, and the crystallite diameter was 7.33 nm.

<Film Coating Method>

A glass substrate (26×76×0.8 mm) was rotated at the number of rotations of 300 rpm by a spin coater (by ABLE Inco.), then 5 cc of ITO dispersion liquid of the example 1 was dropped thereto for 10 seconds, to thereby coat the glass substrate. Note that the ITO dispersion liquid of the example 1 corresponds to ethanol dispersion liquid prepared so that the concentration of the ITO particles is 10 wt %. After coating, the glass substrate was taken out and was dried in the atmosphere at 60° C. for 10 minutes. After drying, the glass substrate was taken out from a drier, then held for one hour in a state of increasing the temperature to 300° C. in nitrogen atmosphere, and thereafter cooled naturally, to thereby obtain an ITO-coated glass substrate. A film thickness of the ITO-coated film in the obtained ITO-coated glass substrate was 100 nm.

<Measurement Method of a Surface Resistance Value>

The surface resistance value of the ITO-coated glass substrate prepared by the aforementioned film coating method was measured. In the measurement, Roresta HP (MCP-T410) by Mitsubishi Chemical Corporation was used, and the surface resistance value was measured by four-terminal method.

A measured value was $3.0 \times 10^3 \Omega/\square$.

<Measurement Method of Haze and Total Light Transmissivity>

A haze value and a total light transmissivity of the ITO-coated glass substrate prepared by the aforementioned film coating method were measured. In the measurement of the haze value, a turbidimeter NDH 2000 by NIPPON DENSHOKU CORPORATION was used as the measurement device. The used glass substrate is MICRO SLLIDE GLASS, product number S-1111 (size: 26×76×0.8) by MATSUNAMI GLASS CORPORATION.

Meanwhile, the haze value and the total light transmissivity of the ITO-coated glass substrate of the example 1 are shown in table 2. However; when the haze value and the total light transmissivity were measured only by the glass substrate, the haze value was 0.13% and the total light transmissivity was 90.50%.

In the total light transmissivity of this example, in some cases, the total light transmissivity of a sample in which the glass substrate was coated with the transparent conductive film, was higher than the total light transmissivity measured only by the glass substrate without coating with a coating material.

For example, the total light transmissivity of the example 1 is 90.72%, and is higher than 90.50%, being the total light transmissivity of the glass substrate without coating. Although the reason therefore is not clarified, it can be considered that although reflection of a light from a light source of the turbidimeter is suppressed by coating the glass substrate with the coating material, the light from the light source is reflected in a case of only the glass substrate, and therefore the total light transmissivity is measured to be higher in appearance in a case of applying the coating film than a case of only the glass substrate. However, the total light transmissivity of the coating film is considered to be at least 90.50% or more of that of the glass substrate.

Meanwhile, when the total light transmissivity of the sample, in which the glass substrate is coated with the transparent conductive film, shows a value lower than the total light transmissivity measured only by the glass substrate without coating the film with coating materials, the total light transmissivity showing the lower value is considered to show the total light transmissivity of the coating film.

<Measurement Method of a Surface Roughness of a Coating Surface>

An average roughness (Ra) and a maximum roughness (Rmax) of the ITO-coated glass substrate prepared by the aforementioned film coating method were measured. In the measurement, a non-contact second/third dimensional minute shape measurement device ET-30HK by Kosaka Laboratory Ltd. was used, and in an analysis of a roughness, a surface roughness analyzer by Kosaka Laboratory Ltd. AY-31 was used.

An average roughness of the coating film of the example 1 was 5 nm, and a maximum roughness thereof was 30 nm.

Example 2

The ITO dispersion liquid and the ITO powders according to example 2 were obtained in the same way as the example 1, other than a point that a heat treatment temperature of the first step was set to 125° C., and the heat treatment temperature of the second step was set to 270°. The measurement similar to the example 1 was performed to the obtained ITO dispersion liquid and the ITO powders. The measurement result was shown in table 1.

As a result of measuring the particles in the same way as the example 1 regarding the ITO particles obtained by the example 2, it was found that the volume average particle diameter of the primary particle was 17.6 nm, the maximum diameter was 9.1 nm, the number proportion of the ITO particles having the primary particle diameter of 20 nm or less was 100%, the BET diameter was 13.8 nm, and the crystallite diameter was 7.8 nm.

Example 3

In the same way as the example 1 other than a point that tetraethylene glycol was used instead of triethylene glycol, as the organic solvent for synthesizing the ITO particles, the ITO dispersion liquid and the ITO powders of example 3 were obtained. The measurement similar to the example 1 was performed to the obtained ITO dispersion liquid and ITO powders. The measurement result was shown in table 1.

As a result of measuring the particles in the same way as the example 1 regarding the ITO particles obtained by the example 3, it was found that the volume average particle diameter of the primary particle was 13.1 nm, the maximum diameter was 15.1 nm, the number proportion of the ITO particles having the primary particle of 20 nm or less was 100%, the BET diameter was 15.2 nm, and the crystallite diameter was 12.9 nm.

Example 4

In the same way as the example 1 other than a point that polyethylene glycol (average molecule amount: 400) was used instead of triethylene glycol, as the organic solvent for synthesizing the ITO particles, and the heat treatment temperature of the first step was set to 140° C., the ITO dispersion liquid and the ITO powders of example 4 were obtained. The measurement similar to the example 1 was performed to the obtained ITO dispersion liquid and ITO powders. The measurement result was shown in table 1.

As a result of measuring the particles in the same way as the example 1 regarding the ITO particles obtained by the example 4, it was found that the volume average particle diameter of the primary particle was 10.8 nm, the maximum diameter was 15.8 nm, the number proportion of the ITO particles having the primary particle of 20 nm or less was 100%, the BET diameter was 14.6 nm, and the crystallite diameter was 11.3 nm.

Example 5

In the same way as the example 1 other than a point that ethylene glycol was used as the organic solvent of the first step and triethylene glycol was used as the organic solvent for washing the precursor and synthesizing the ITO particles, the ITO dispersion liquid and the ITO powders of example 5 were obtained. The measurement similar to the example 1 was performed to the obtained ITO dispersion liquid and ITO powders. The measurement result was shown in table 1.

As a result of measuring the particles in the same way as the example 1 regarding the ITO particles obtained by the example 5, it was found that the volume average particle diameter of the primary particle was 9.0 nm, the maximum diameter was 10.1 nm, the number proportion of the ITO particles having the primary particle of 20 nm or less was 100%, the BET diameter was 12.1 nm, and the crystallite diameter was 9.3 nm.

Comparative Example 1

187.4 g of indium chloride aqueous solution (InCl$_3$) having 20.29 wt % indium concentration, and 11.9 g of tin chloride (SnCl$_2$.2H$_2$O) were weighed and dissolved into pure water, to thereby prepare 2.9 L of the mixed solution of indium chloride and tin chloride. Note that in the mixed solution, the concentration of tin was 10 mol % with respect to the total amount of indium and tin.

Meanwhile, 230 g of NH$_3$ aqueous solution having 25 wt % concentration was diluted with 1770 g of pure water, to thereby set a liquid temperature at 20° C. Note that in the NH$_3$ aqueous solution, the amount of NH$_3$ is the amount equivalent to three times the amount required for neutralizing the mixed solution of the indium chloride and the tin chloride.

The NH$_3$ aqueous solution was stirred, and the mixed solution of the indium chloride and the tin chloride was added thereto for 30 minutes, to thereby obtain a suspended liquid of the tin-containing indium hydroxide. The generated suspended material of the tin-containing indium hydroxide was filtered and collected by the centrifugal separation method and washed with pure water, to thereby obtain the cake of the tin-containing indium hydroxide. The cake of the tin-containing indium hydroxide was dried for 6 hours at 100° C., to thereby obtain the precursor mainly composed of indium (tin-containing indium hydroxide).

10 g of the precursor mainly composed of the indium (tin-containing indium hydroxide) was weighed in dry weight and filled into a separable flask, and further 240 ml of triethylene glycol was added and stirred, to thereby disperse the precursor mainly composed of indium into the triehylene glycol. Here, a lid was put on the flask, and nitrogen gas was blown into the triethylene glycol for 30 minutes, to purge inside of the flask by gas. Along with blowing of the nitrogen, the number of times of stirring was set to 300 rpm, to stir the triethylene glycol which is further heated from the room temperature to 300° C. at a temperature increase rate of 2° C./min, and held for 2 hours after the temperature reached 300° C., to thereby obtain the ITO powders according to comparative example 1.

As a result of measuring the particles in the same way as the example 1 regarding the ITO particles obtained by the comparative example 1, it was found that the volume average particle diameter of the primary particle was 20.5 nm, the maximum diameter was 48.5 nm, the number proportion of the ITO particles having the primary particle diameter of 20 nm or less was 80%, the BET diameter was 23.2 nm, and the crystallite diameter was 33.9 nm. The measurement result is shown in table 1.

Figure 2:
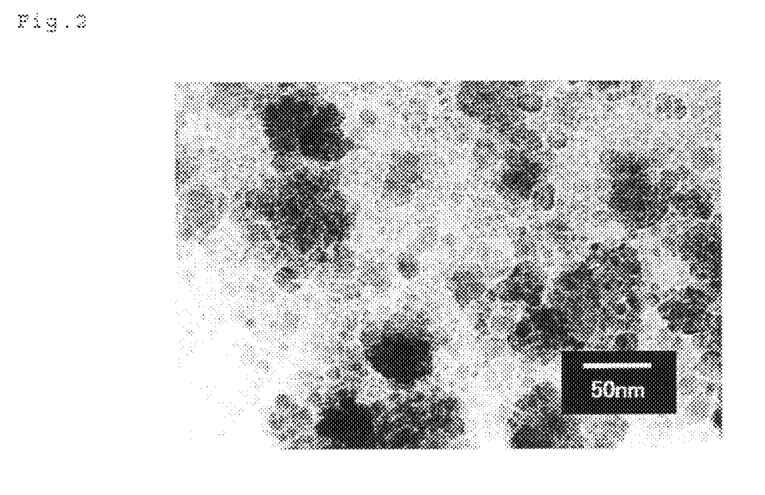
FIG. 2 is a TEM photograph of the ITO particles according to comparative example 1.

Note that the TEM photograph of the ITO particles with 200,000 magnification according to the comparative example 1 (visual field: 350×250 nm) is shown in FIG. 2.

The haze of the coating film of the comparative example 1 was 0.72, the total light transmissivity was 89.90%, the average roughness was 6 nm, and the maximum roughness was 120 nm. The measurement result is shown in table 2.

Next, in examples 6 to 8, the starting raw material was changed to prepare a sample and a test was conducted.

Example 6

In the same way as the example 1 other than a point that the starting raw material was changed to tin nitrate from tin chloride, the ITO dispersion liquid and the ITO powders according to the example 6 were obtained. Note that 7.75 g of tin nitrate aqueous solution having 11.10 wt % tin concentration was used as the tin nitrate.

Then, as a result of measuring the particles in the same way as the example 1 regarding the ITO particles obtained by the example 6, it was found that the volume average particle diameter of the primary particle was 8.1 nm, the maximum diameter was 10.1 nm, the number proportion of the ITO particles having the primary particle diameter of 20 nm or less was 100%, the BET diameter was 8.6 nm, and the crystallite diameter was 8.4 nm. The measurement result is shown in table 1.

Example 7

In the same way as the example 1 other than a point that the starting raw material was changed to tin acetate from tin chloride, the ITO dispersion liquid and the ITO powders according to the example 7 were obtained.

Then, as a result of measuring the particles in the same way as the example 1 regarding the ITO particles obtained by the example 7, it was found that the volume average particle diameter of the primary particle was 7.1 nm, the maximum diameter was 9.9 nm, the number proportion of the ITO particle having the primary particle diameter of 20 nm or less was 100%, the BET diameter was 9.5 nm, and the crystallite diameter was 9.7 nm. The measurement result is shown in table 1.

Example 8

In the same way as the example 1 other than a point that the starting raw material was changed to indium nitrate crystal from indium nitrate solution, the ITO dispersion liquid and the ITO powders according to the example 8 were obtained.

23.07 g of indium (III) nitrate trihydrate (In(NO$_3$)$_3$.3H$_2$O) and 1.68 g of tin chloride (SnCl$_2$.2H$_2$O) were weighed, and dissolved into triethylene glycol. By performing operation similar to the example 1 other than the aforementioned point, the ITO dispersion liquid and the ITO powders according to the example 8 were obtained.

Then, as a result of performing measurement similar to the example 1, to the ITO particles of the example 8, it was found that the volume average particle diameter of the primary particle was 7.5 nm, the maximum diameter was 8.6 nm, the number proportion of the ITO particles having the primary particle diameter of 20 nm or less was 100%, the BET diameter was 8.5 nm, and the crystallite diameter was 7.2 nm. The measurement result is shown in table 1.

TABLE 1

| | Starting substance | | | Decomposition condition | | Generation condition | | Particle properties | | | | |
|---|---|---|---|---|---|---|---|---|---|---|---|---|
| | In raw material | Sn raw material | Solvent | Temperature (° C.) | Time (hr) | Temperature (° C.) | Time (hr) | Average diameter (nm) | Maximum diameter (nm) | BET (m2/g) | BET diameter (nm) | Crystallite diameter (nm) |
| Example 1 | In nitrate | Sn chloride | Tri EG | 130 | 1 | 280 | 4 | 7.2 | 8.5 | 63.0 | 13.3 | 7.3 |
| Example 2 | In nitrate | Sn chloride | Tri EG | 125 | 1 | 270 | 4 | 7.6 | 9.1 | 61.5 | 13.8 | 7.8 |

TABLE 1-continued

| | Starting substance | | | Decomposition condition | | Generation condition | | Particle properties | | | | |
|---|---|---|---|---|---|---|---|---|---|---|---|---|
| | In raw material | Sn raw material | Solvent | Temperature (°C.) | Time (hr) | Temperature (°C.) | Time (hr) | Average diameter (nm) | Maximum diameter (nm) | BET (m2/g) | BET diameter (nm) | Crystallite diameter (nm) |
| Example 3 | In nitrate | Sn chloride | Tetra EG | 130 | 1 | 280 | 4 | 13.1 | 15.1 | 55.0 | 15.2 | 12.9 |
| Example 4 | In nitrate | Sn chloride | Poly EG | 140 | 1 | 320 | 4 | 10.8 | 15.8 | 57.4 | 14.6 | 11.3 |
| Example 5 | In nitrate | Sn chloride | EG→Tri EG | 130 | 1 | 280 | 2 | 9.0 | 10.1 | 69.0 | 12.1 | 9.3 |
| Example 6 | In nitrate | Sn nitrate | Tri EG | 130 | 1 | 280 | 4 | 8.1 | 10.1 | 98.0 | 8.6 | 8.4 |
| Example 7 | In nitrate | Sn acetate | Tri EG | 130 | 1 | 280 | 4 | 7.1 | 9.9 | 88.0 | 9.5 | 9.7 |
| Example 8 | In nitrate | Sn chloride | Tri EG | 130 | 1 | 280 | 4 | 7.5 | 8.6 | 99.0 | 8.5 | 7.2 |
| Com* 1 Example | Tin-containing In hydroxide | | Tri EG | 130 | 1 | 280 | 4 | 20.5 | 48.5 | 36.1 | 23.2 | 33.9 |

Com* Comparative

TABLE 2

| | Haze | Total light transmissivity (%) | Average roughness (nm) | Maximum roughness (nm) |
|---|---|---|---|---|
| Example 1 | 0.59 | 90.72 | 5 | 30 |
| Com* Example 1 | 0.72 | 89.90 | 6 | 120 |

Com* Comparative (Evaluation)

Examples 1 to 5, and the comparative example 1 are evaluated. As is clarified from the table 1 and the table 2, ultrafine particulate ITO particles were obtained, in which all of the volume average particle diameter, maximum diameter, BET diameter, and crystallite diameter were 20 nm or less, and the number proportion of the ITO particle having the primary particle diameter of 20 nm or less was 100%, and further in examples 1, 2, 5, the number proportion of the ITO particle having the primary particle diameter of 15 nm or less was also 100%.

Further, the coating film with low haze and high total light transmissivity could be obtained, as the coating film properties of the ITO film prepared by using the ITO dispersion liquid of the examples 1 to 5, wherein the haze was within a range of 0.6% or less, and the total light transmissivity was 90% or more.

Also, in examples 6 to 8 in which the starting raw material was changed, in the same way as the examples 1 to 5, ultrafine particulate ITO particles could be obtained, wherein all of the volume average particle diameter, maximum diameter, BET diameter, and crystallite diameter were 20 nm or less, the number proportion of the ITO particles having primary particle diameter of 20 nm or less was 100%, and the number of proportion of the ITO particles having primary particle diameter of 15 nm or less was also 100%. Regarding the ITO film prepared by using the ITO dispersion liquid of the examples 6 to 8 as well, the coating film similarly having a low haze value and high total light transmissivity could be obtained. Accordingly, it was found that the result similar to the results of the examples of 1 to 5 could be obtained, even if the starting raw material was changed, as long as the starting raw material which is decomposed at 250° C. or less was used.

Meanwhile, according to the comparative example 1, in the particle characteristics, all of the average particle diameter, maximum diameter, BET diameter, and crystallite diameter were 20 nm or more, which were greater than those of the examples of the present invention.

Further, regarding the coating film properties of the ITO film prepared by using the ITO dispersion liquid of the comparative example 1, the coating film having a high haze and a low total light transmissivity could be obtained, in which the haze was 0.6% or more and the total light transmissivity was 90% or less. Namely, it was found that the coating film of the comparative example 1 had the high haze and the low total light transmissivity.

Further, when the surface roughness after coating between the example and the comparative example were compared, there was no great difference in the average roughness, but regarding the maximum roughness, a tremendously small value was obtained on the coating film surface of the example, compared with that of the comparative example, and namely, it was found that the coating film with excellent smoothness could be obtained in the transparent conductive film composed of the ITO particles according to the examples of the present invention.

As described above, the present invention is described based on the aforementioned embodiments. However, the present invention is not limited thereto. According to this example, the tin-containing indium oxide (ITO) is given as the material. However, the present invention can also be applied to synthesizing transparent conductive film particles such as antimony doped tin oxide (ATO), aluminium doped zinc oxide, fluorine doped indium oxide, tin oxide, zinc oxide, ITO, and ATO.

Further, a part of the ITO ultrafine particles obtained by this example may be substituted with a publicly-known compound having transparent conductivity.

What is claimed is:

1. A method of producing ITO powders having a crystal diameter less than 20 nm, the method comprising:
    a first step of dissolving nitrate salt containing indium and nitrate salt containing tin into an organic solvent, then applying heat treatment to the organic solvent at a temperature ranging from 110° C. to 250° C., and thermally decomposing the nitrate salt containing indium and the nitrate salt containing tin, to thereby prepare a precursor containing indium and tin; and a second step of applying heat treatment to the precursor containing the indium and tin in an organic solvent heated at a temperature ranging from 200° C. to 350° C. to thereby generate ITO particles, wherein the organic solvent used in the first step is at least one solvent selected from the group consisting of ethylene glycol, diethylene glycol, triethylene glycol, tetraethylene glycol, polyethylene glycol, propylene glycol, dipropylene glycol, and tripropylene glycol, and the organic solvent used in the second step is at least one solvent selected from the group consisting of diethylene glycol, triethylene glycol, tetraethylene glycol, polyethylene glycol, and tripropylene glycol.

2. The method of producing ITO powders having a crystal diameter less than 20 nm according to claim 1, wherein in the first step of dissolving the nitrate salt containing indium and the nitrate salt containing tin into the organic solvent, the heat treatment is applied at a temperature ranging from 125° C. to 250° C.

* * * * *